(12) United States Patent
Watanabe

(10) Patent No.: US 7,077,655 B2
(45) Date of Patent: Jul. 18, 2006

(54) CALCULATION TRAINING TOOL, AND CALCULATION TRAINING SYSTEM

(76) Inventor: Tadao Watanabe, 2-2, Kiyokawa 2-chome, Taito-ku, Tokyo (JP) 111-0022

( * ) Notice: Subject to any disclaimer, the term of this patent is extended or adjusted under 35 U.S.C. 154(b) by 0 days.

(21) Appl. No.: 10/842,633

(22) Filed: May 11, 2004

(65) Prior Publication Data

US 2005/0239023 A1    Oct. 27, 2005

(30) Foreign Application Priority Data

Mar. 31, 2004    (JP) ............... 2004-107460

(51) Int. Cl.
*G09B 19/02* (2006.01)
(52) U.S. Cl. .................................... 434/203
(58) Field of Classification Search ........... 434/188, 434/191, 202, 203, 204, 205
See application file for complete search history.

(56) References Cited

U.S. PATENT DOCUMENTS

| 604,963 | A | * | 5/1898 | Breinl | 434/203 |
|---|---|---|---|---|---|
| 2,486,260 | A | * | 10/1949 | Church | 434/204 |
| 2,564,976 | A | * | 8/1951 | Hooper | 434/204 |
| 2,844,890 | A | * | 7/1958 | Oliver et al. | 434/203 |
| 2,872,742 | A | * | 2/1959 | Schott | 434/203 |
| 2,899,757 | A | * | 8/1959 | Oliver | 434/204 |
| 3,500,558 | A | * | 3/1970 | Matejczyk | 434/189 |
| 3,571,950 | A | * | 3/1971 | Walker | 434/197 |
| 5,149,269 | A | * | 9/1992 | Ylitalo | 434/203 |
| 5,205,747 | A | * | 4/1993 | Tan | 434/203 |
| 5,334,026 | A | * | 8/1994 | Ylitalo | 434/203 |
| 6,375,468 | B1 | * | 4/2002 | Sundararajan | 434/203 |

* cited by examiner

*Primary Examiner*—Kurt Fernstrom
(74) *Attorney, Agent, or Firm*—Arent Fox, PLLC.

(57) ABSTRACT

The calculation training tool comprises: a substrate; a plurality of bead-shaped members mounted movably on the substrate; and scales displayed on the substrate surface together with numerals for giving answers when an addition and a subtraction are made by moving the bead-shaped members. The training system uses learning papers prepared for learning numeral composing and decomposing methods, together with the calculation training tool.

12 Claims, 15 Drawing Sheets

CALCULATION TRAINING TOOL, AND CALCULATION TRAINING SYSTEM

BACKGROUND OF THE INVENTION

1. Field of the Invention

The present invention relates to a calculation training tool for teaching fundamentals of addition and subtraction especially to fresh pupils of low ages, and to a training system using that tool.

2. Description of the Related Art

A beginner pupil can easily learn the fundamental calculations of addition and subtraction if tools such as marbles, tiles or blocks are used. This is because the pupil can visually recognize the result easily if the marbles, tiles or blocks are moved by the number of addition or subtraction.

However, the tools such as marbles, tiles or blocks are troublesome for preparations and are easily scattered and lost.

Another method is to count the number with the fingers of the pupil.

Although it is very primitive and easy to recite the number by folding the fingers, not any text but the fingers themselves are used. Therefore, this method is not easy for training the pupils on the educational site. Moreover, the teacher finds it difficult with the on-finger counting method to teach the concepts of increase/decrease, sum and remainder, and the pupils also find it difficult to learn those concepts.

If an abacus or "soroban" is used, on the other hand, the result of calculation can be visually confirmed so that the calculations can be visually learned in the effective manner. However, it takes a long time and a hard training to learn the operations of the abacus proficiently, and the beginner pupil of a low age to learn the basis of calculations for the first time finds it difficult to use the abacus.

This is because the operations themselves of the abacus contain the elements of addition and subtraction and the elements of the on-finger counting method with the mental calculations, and because the movements of beads are just to confirm the results of the mental calculations.

From these points, therefore, it is not proper to use the abacus itself as a training tool for the pupil of a low age at the stage where the pupil is required for learning the addition and subtraction themselves.

On the other hand, the pupil learns a by-writing calculation at an elementary school. This by-writing calculation is done by writing an operand and an addend/subtrahend at upper and lower positions. In a carrying-up or carrying-down case, it is necessary to write the number to be carried as a suffix. Under these circumstances, the pupil needs a very long time for learning the carrying-up-down procedure, and the teacher finds it troublesome to teach that stage.

In short, any of the aforementioned calculation methods of the related art is neither easy for the pupil to learn nor efficient for the teacher.

Here, the Inventor has not acquired any publication of the related art on the training tool, which can solve the aforementioned problems.

SUMMARY OF THE INVENTION

An object of the invention is to provide a training tool and a training system capable of solving the problems thus far described, and to provide: a calculation training tool for enabling a pupil to learn an addition and a subtraction or the basis of calculations rationally without any confusion while recognizing the concepts of "addition" and "subtraction" and easily by visual confirmations, thereby to bridge the by-writing calculations at schools; and a training system for training the calculation training tool effectively.

In order to achieve the aforementioned object, according to the invention, there is provided a calculation training tool comprising: a substrate; a plurality of diametrically small moving members mounted movably on the substrate and corresponding individually to individual numerals for calculations; and a sequence of numerals of 1 to 9 arranged at an interval substantially equal to the width spacing of the diametrically small moving member.

The calculation training tool according to the invention performs the calculations by moving the diametrically small moving members as in the abacus. Unlike the abacus, however, an answer numeral is displayed in a manner to correspond to the movements of the diametrically small moving members.

In the calculation training tool of the invention, in the sequence of numerals, a numeral of 10 is arranged next to the first numerals of 1 to 9. In the present invention, the numeral sequence has a unit of 10.

In the calculation training tool of the invention, moreover, the substrate is formed into a long plate shape, and the diametrically small moving members are arranged slidably along a guide member disposed in the longitudinal direction of the substrate. Division lines are formed between adjoining numerals.

In the present invention, therefore, the diametrically small moving members move along the longitudinal direction of the substrate so that the arranged states of the diametrically small moving members can be easily confirmed in a visual manner with the division lines.

In the invention, the diametrically small moving members are formed into a ball shape, whereby an addition or subtraction is practiced by using the diametrically small moving members.

In the invention, therefore, the diametrically small moving members are formed into the ball shape so that they can be visually recognized. Apparently, moreover, the feel of using the diametrically small moving members is similar to that of abacus so that the users such as the pupils or teachers do not feel any disorder.

In the invention, moreover, the guide member is formed into a slender rod disposed along the longitudinal direction of an abacus, and the diametrically small moving members are arranged by threading the rod thereinto. The numeral sequence is so arranged on the two sides of the diametrically small moving members threaded on the rod that the numeral sequence on one side is described in an ascending order from 1 to 9 whereas the numeral sequence on the other side is described in a descending order from 9 to 1.

In the invention, the rod is arranged in plurality in parallel with each other in the transverse direction of the substrate and each has the diametrically small moving members.

According to the invention, moreover, there is provided a calculation training system comprising: a learning step of using learning papers for learning the "numeral composing method" for answering a total number by adding a plurality of numbers and the "numeral decomposing method" for decomposing a number into a plurality of smaller numbers; and a learning step of learning the "numeral composing method" and the "numeral decomposing method" by using the calculation training tool.

The "numeral composing method" and the "numeral decomposing method" are mentally learned by using the learning papers, and can be learned in a confirming manner physically with hands and eyes by additionally using the calculation training tool.

In the invention, the "numeral decomposing method" includes the "operand decomposing method" for decomposing a minuend in a subtraction; and the "addend decomposing method" for decomposing an augend in an addition, and the learning papers are provided with practical problems for learning the "numeral composing method", the "operand decomposing method" and the "addend/subtrahend decomposing method".

Therefore, the pupil is enabled to learn the numeral composing method, the operand decomposing method and the addend/subtrahend decomposing method by answering the practical problems of the learning papers.

In the invention, the practical problems are provided with three numeral display portions, whose two numeral display portions display numerals in advance whereas the remaining numeral display portion is blank, so that the pupil may write a correct numeral in the blank.

In the invention, after the learning step of learning the "number composing method", the "operand decomposing method" and the "addend/subtrahend decomposing method" by using the learning papers of three kinds was performed, the calculation learning step is performed by using the aforementioned calculation training tool.

In the calculation training system according to the invention, more specifically, the pupil is trained on the concepts of the numeral composing method, the operand decomposing method and the addend/subtrahend decomposing method necessary for using the calculation training tool. After this, the pupil performs actual calculations by using the calculation training tool actually so that the pupil can understand the meaning of moving the diametrically small moving members.

In the calculation training tool according to the invention, the calculations can be actually practiced by moving the diametrically small moving members as in the abacus. As a result, the pupil can recognize the calculation procedure visually so that the pupil can easily understand the concepts of the increase/decrease, sum and remainder and the procedures of calculations of addition and subtraction rationally and briefly and can learn the calculation methods easily.

Unlike the ordinary abacus, moreover, the answers are displayed in the individual numerals so that the pupil can recognize the calculation results quickly and directly at a glance with the numerals, and so that the teacher can teach the pupil easily to improve the educational effects.

As compared with the abacus, moreover, the calculation training tool has a simpler structure than that of the abacus and can be manufactured at a lower cost so that it can be provided at a reasonable price and can be easily owned by public schools, private schools and homes.

Moreover, the calculation training tool according to the invention has the numeral sequences of 1 to 9 formed consecutively at the unit of 10. Therefore, the calculation training tool allows the pupil to repeat the practices of the concepts of the simple addition and subtraction of one figure and two figures.

In the calculation training tool according to the invention, moreover, for the practices of additions and subtractions, it is sufficient to move the diametrically small moving members only in the longitudinal direction along the guide member, so that the operations are far easier than those of the abacus. Unlike the abacus, therefore, the pupil finds no trouble for learning the operating method but can face the learning of the calculation methods soon. At schools, moreover, the teacher can teach the operations easily.

Moreover, the calculation training tool according to the invention is constructed to teach the methods of addition and subtraction by using the diametrically small moving members formed in the ball shape and to have a shape and a structure similar to those of the abacus. Therefore, the calculation training tool can be used without any disorder in the educational site.

In the calculation training tool according to the invention, moreover, the practices can be easily learned by moving the diametrically small moving members along the rod and by using the two numeral sequences on the two sides of the diametrically small moving members.

In the calculation training tool according to the invention, moreover, the pupil can learn the calculations with a plurality of rows of diametrically small moving members.

Moreover, the calculation training system according to the invention comprises: the learning step of using learning papers for learning the "numeral composing method" for answering a total number by adding a plurality of numbers and the "numeral decomposing method" for decomposing a number into a plurality of smaller numbers; and the learning step of learning the "numeral composing method" and the "numeral decomposing method" by using the calculation training tool. Therefore, the calculation training tool is used together with the learning papers prepared for learning the composition and decomposition of numbers, and the fundamental concepts necessary for the case of calculations using the calculation training tool are acquired with the learning papers. Thus, the pupil can easily understand what is meant by moving the diametrically small moving members in the calculation training tool. Therefore, it is possible to enhance the educational effects drastically.

In the invention, moreover, the aforementioned "numeral decomposing method" includes the "operand decomposing method" for decomposing a minuend in a subtraction; and the "addend decomposing method" for decomposing an augend in an addition, and the learning papers are provided with practical problems for learning the "numeral composing method", the "operand decomposing method" and the "addend/subtrahend decomposing method". On the learning papers, therefore, the pupil can be repeatedly trained on the fundamentals of addition and subtraction such as the "number composing method", the "operand decomposing method" and the "addend/subtrahend decomposing method" so that the pupil can learn the fundamentals of addition and subtraction sufficiently.

In the invention, the aforementioned learning papers are provided with three numeral display portions, whose two numeral display portions display numerals in advance whereas the remaining numeral display portion is blank, so that the pupil may write a correct numeral in the blank. Therefore, the "number composing method", the "operand decomposing method" and the "addend/subtrahend decomposing method" can be learned easily and smoothly merely by performing the works of filling the blanks.

In the invention, after the pupil practiced the "number composing method", the "operand decomposing method" and the "addend/subtrahend decomposing method" by using the learning papers of three kinds, the pupil performs the calculations actually by using the aforementioned calculation training tool. Therefore, the pupil can work the number composing method, the operand decomposing method and the addend/subtrahend decomposing method, which have been mentally practiced on the learning papers, actually and visually with hands so that the pupil can learn the practical addition and subtraction more reliably and easily.

DESCRIPTION OF THE PREFERRED EMBODIMENT

An embodiment of the invention will be described with reference to the accompanying drawings.

Figure 1:
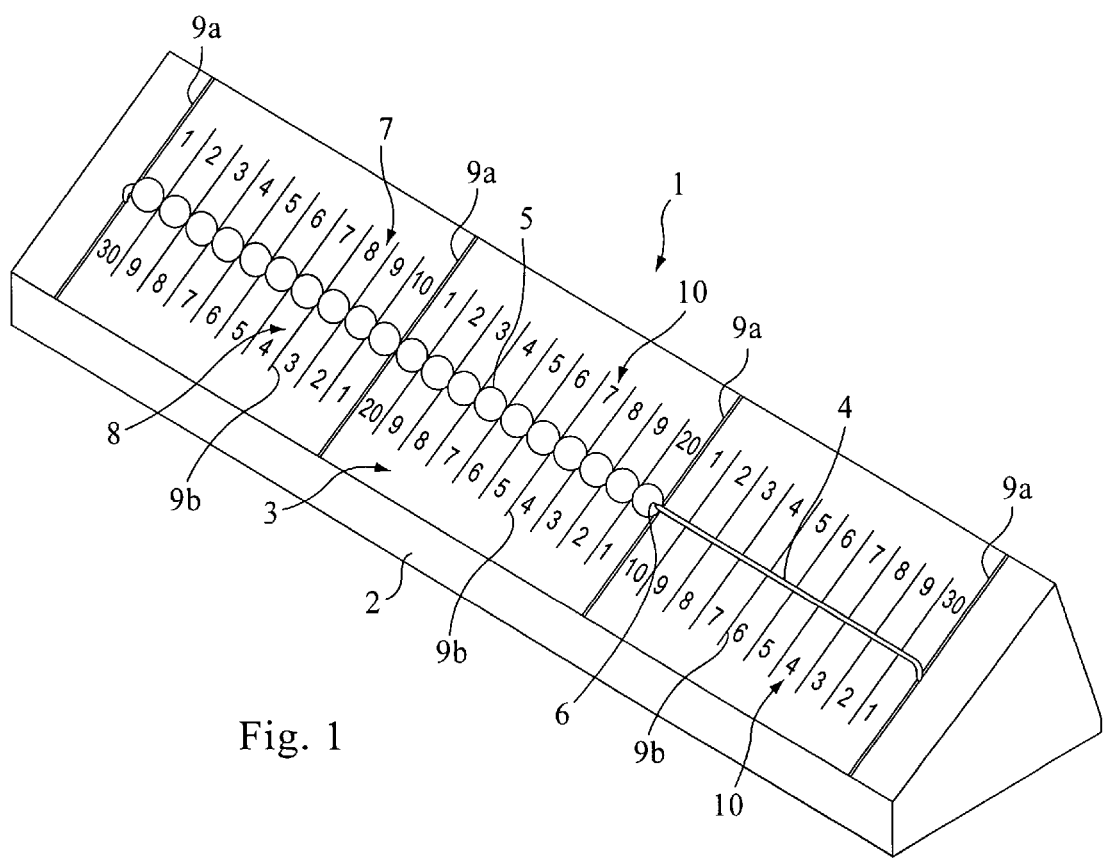
FIG. 1 is a perspective view of a calculation training tool according to one embodiment of the invention.

First of all, a calculation training tool 1 according to the invention is constructed, as shown in FIG. 1, to include: a substrate 2; a plurality of bead-shaped members 5 mounted movably on the substrate 2; and scales 7 and 8 displayed on the substrate surface together with numerals 10 for indicating the answers of addition and subtraction when the bead-shaped members 5 are moved.

As shown in FIG. 1, moreover, the substrate 2 is formed into a transversely long plate shape. The bead-shaped members 5 are so mounted on one transverse rod-shaped guide member 4 extending therethrough as to slide freely in the longitudinal direction of the guide member 4. This guide member 4 is arranged at the widthwise center of the substrate 2 in the longitudinal direction of the substrate 2. The scales 7 and 8 are displayed above and below the bead-shaped members 5, respectively.

As shown in FIG. 1, still moreover, the upper scale 7 displayed on the upper side of the bead-shaped members 5 is indicated in the ascending order from the left to the right, and the lower scale 8 displayed on the lower side of the bead-shaped members 5 is indicated in the descending order from the left to the right.

On the other hand, a calculation training system according to the embodiment uses the calculation training tool 1 shown in FIG. 1, together with learning papers 11a, 11b, 11c, 14a, 14b, 14c, 17a, 17b, 19a, 19b, 19c, 24a, 24b, 24c, 28a, 28b, 28c, 32a and 32b, as shown in FIG. 9 to FIG. 15, which are prepared by learning the number composing method and the number decomposing method.

Moreover, the learning papers 11a, 11b, 11c, 14a, 14b, 14c, 17a, 17b, 19a, 19b, 19c, 24a, 24b, 24c, 28a, 28b, 28c, 32a and 32b are provided with three patterns for learning the number composing method, the operand decomposing method and the addend/subtrahend decomposing method.

Still moreover, the learning papers 11a, 11b, 11c, 14a, 14b, 14c, 17a, 17b, 19a, 19b, 19c, 24a, 24b, 24c, 28a, 28b, 28c, 32a and 32b are provided with three numeral display portions, whose two numeral display portions display numerals in advance. The remaining numeral display portion is blank, and the pupil writes a correct numeral in the blank.

After the pupil learned the number composing method, the operand decomposing method and the addend/subtrahend decomposing method sufficiently using the aforementioned three kinds of learning papers 11a, 11b, 11c, 14a, 14b, 14c, 17a, 17b, 19a, 19b, 19c, 24a, 24b, 24c, 28a, 28b, 28c, 32a and 32b, furthermore, the pupil is trained to perform the practical calculations by using the calculation training tool 1 shown in FIG. 1.

FIG. 1 shows the calculation training tool 1 according to the embodiment of the invention. This calculation training tool 1 is made of plastics and is provided with the substrate 2, which is formed into such a transversely long plate shape as has a surface sloped down to the front, as shown in FIG. 1.

Here, the substrate 2 can also be made of a material such as metal or wood.

The rod-shaped guide member 4 is disposed at the transverse center portion of the surface portion 3 of the substrate 2 along the longitudinal direction of the substrate 2, that is, in the transverse direction, as shown in FIG. 1.

This guide member 4 is formed of a wire of a metal such as stainless steel and is retained by bending its two end portions downward generally at a right angle and by burying the bent end portions in the substrate 2.

The bead-shaped members 5 are mounted on the guide member 4, as shown in FIG. 1, by threading them slidably in the longitudinal direction on the guide member 4. Specifically, the bead-shaped members 5 are formed of a hard material such as plastics, metal or wood generally into a ball shape and are bored at their center portions with holes 6, through which the guide member 4 is threaded. In the embodiment, twenty bead-shaped members 5 are mounted on the guide member 4. However, the number of the bead-shaped members 5 should not be limited to the twenty.

On the surface portion 3 of the substrate 2, as shown in FIG. 1, there are displayed the scales 7 and 8 on the upper and lower sides of the guide member 4, which mounts the bead-shaped members 5 slidably.

The scales 7 and 8 are composed of: a number of parallel scale lines 9a and 9b drawn at a right angle with respect to the longitudinal direction of the substrate 2; and the numerals 10 displayed in the spaces between the scale lines 9a and 9b and the adjoining scale lines 9a and 9b.

The intervals between the scale lines 9a and 9b and the adjoining scale lines 9a and 9b are set to the same size as the external diameter of the bead-shaped members 5 in the sliding direction. In other words, the bead-shaped members 5 are so shaped that they can be arranged just in the spaces between the scale lines 9a and 9b and the adjoining scale lines 9a and 9b. In case the bead-shaped members 5 are gathered on one end side of the guide member 4, for example, the individual numerals of 1, 2, 3, - - - , and soon are displayed to correspond one-by-by to the individual bead-shaped members 5.

The scale lines 9a and 9b are drawn by thirty one in total, and the first, eleventh, twenty first and thirty first scale lines 9a are drawn in double lines fully in the transverse direction of the substrate 2, whereas the remaining scale lines 9b are drawn in single lines only at the central portions of the transverse direction of the substrate 2.

Here, the numbers of the scale lines 9a and 9b are arbitrary so that they can be suitably increased or decreased.

In the upper scales 7 disposed on the upper side of the guide member 4 having the bead-shaped members 5 mounted slidably thereon, the numerals are displayed in the ascending order from the left to the right. In other words, the upper scales 7 are displayed to have numerals increased by 1 from 1 and to have the last number 30. Here are omitted the numerals 1 of the order of tens in the numerals 11 to 19 and the numerals 2 of the order of tens in the numerals 21 to 29.

In the lower scales 8 disposed on the lower side of the guide member 4 having the bead-shaped members 5 mounted slidably thereon, on the other hand, the numerals are displayed in the descending order from the left to the right. In other words, the lower scales 8 are displayed to have numerals decreased by 1 from 30 and to have the last number 1. Here are omitted the numerals 2 of the order of tens in the numerals 29 to 21 and the numerals 1 of the order of tens in the numerals 19 to 11.

By using the upper scales 7, the calculation training tool 1 can obtain the answers by the adding and subtracting calculations using the composing method and the augent decomposing method. By using the lower scales 8, the calculation training tool 1 can obtain the answers by the adding calculations using the composing method and the addend/subtrahend decomposing method.

Here, the "composing method" indicates the training method to obtain a sum by adding a plurality of numbers so as to train a concept of decomposing a number into a plurality of components.

Moreover, the "addend decomposing method" indicates the training method to think an addition by decomposing an addend into a plurality of components, and the "operand decomposing method" indicates the training method to think a subtraction by decomposing a minuend into a plurality of components.

A specific using method of the calculation training tool 1 will be described with reference to FIG. 2 to FIG. 8.

Figure 2:
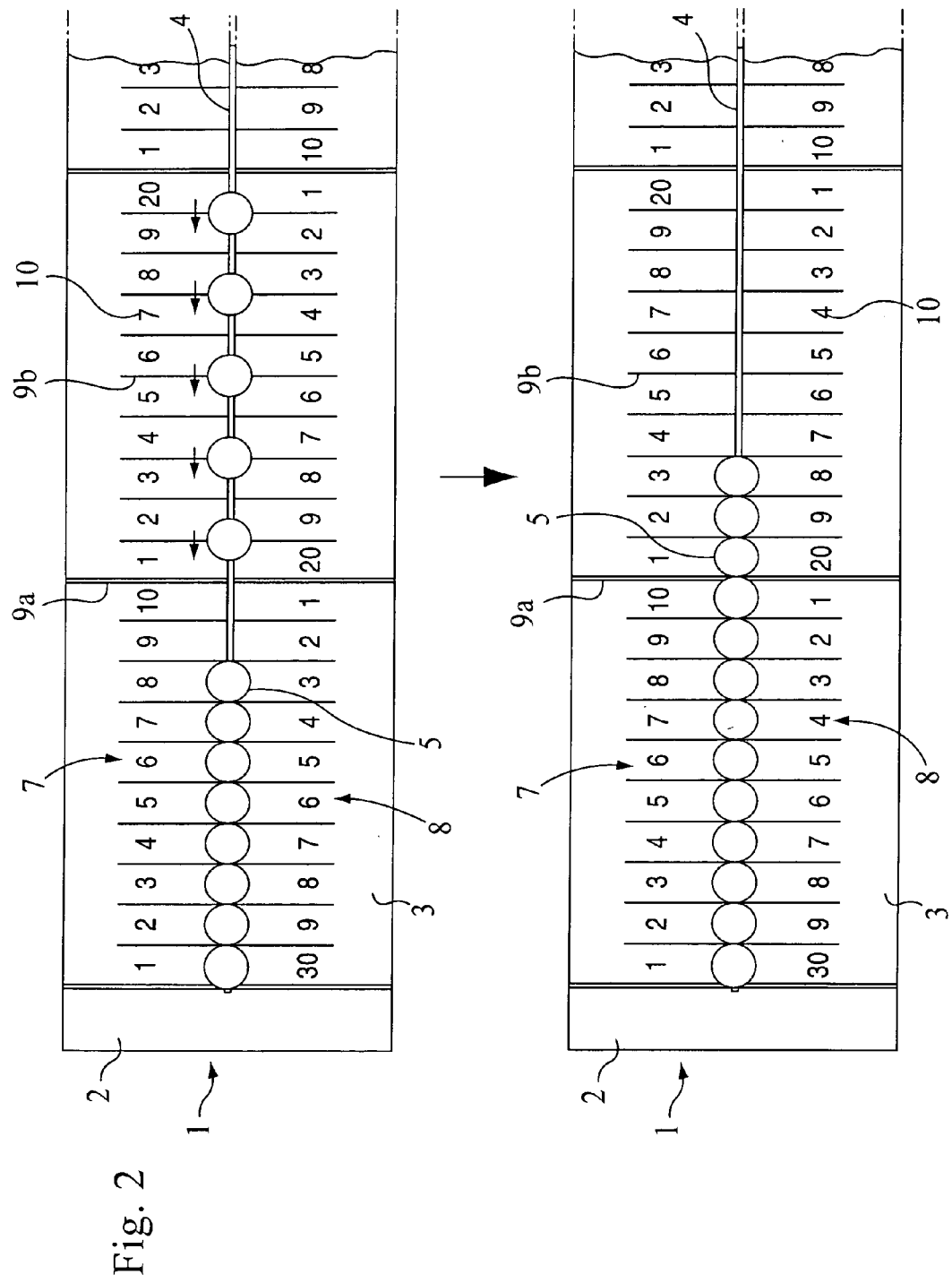
FIG. 2 is a top plan view showing an operation method of the case, in which an addition is to be learned by using the calculation training tool according to the embodiment.

First of all, FIG. 2 shows an operation method for determining the answer of a calculation (e.g., an addition) of (8+5) by a counting-up method using the upper scales 7.

Specifically, the augend 8 is expressed by arranging eight bead-shaped members 5 as the placed beads (i.e., the bead-shaped members fixed and not moved) rightward from the left end of the guide member 4. Of the residual bead-shaped members 5, the five bead-shaped members 5 as the addend 5 are moved one by one as the carried beads (i.e., the bead-shaped members moved) leftward from the right side while sequentially reciting them (that is, while orally reciting the addends each time the bead-shaped members are moved), so that the five bead-shaped members 5 are merged into the eight placed beads. As a result, the last carried bead stops at the position of the scale indicating the numeral 13 so that the answer of "13" can be obtained.

Figure 3:
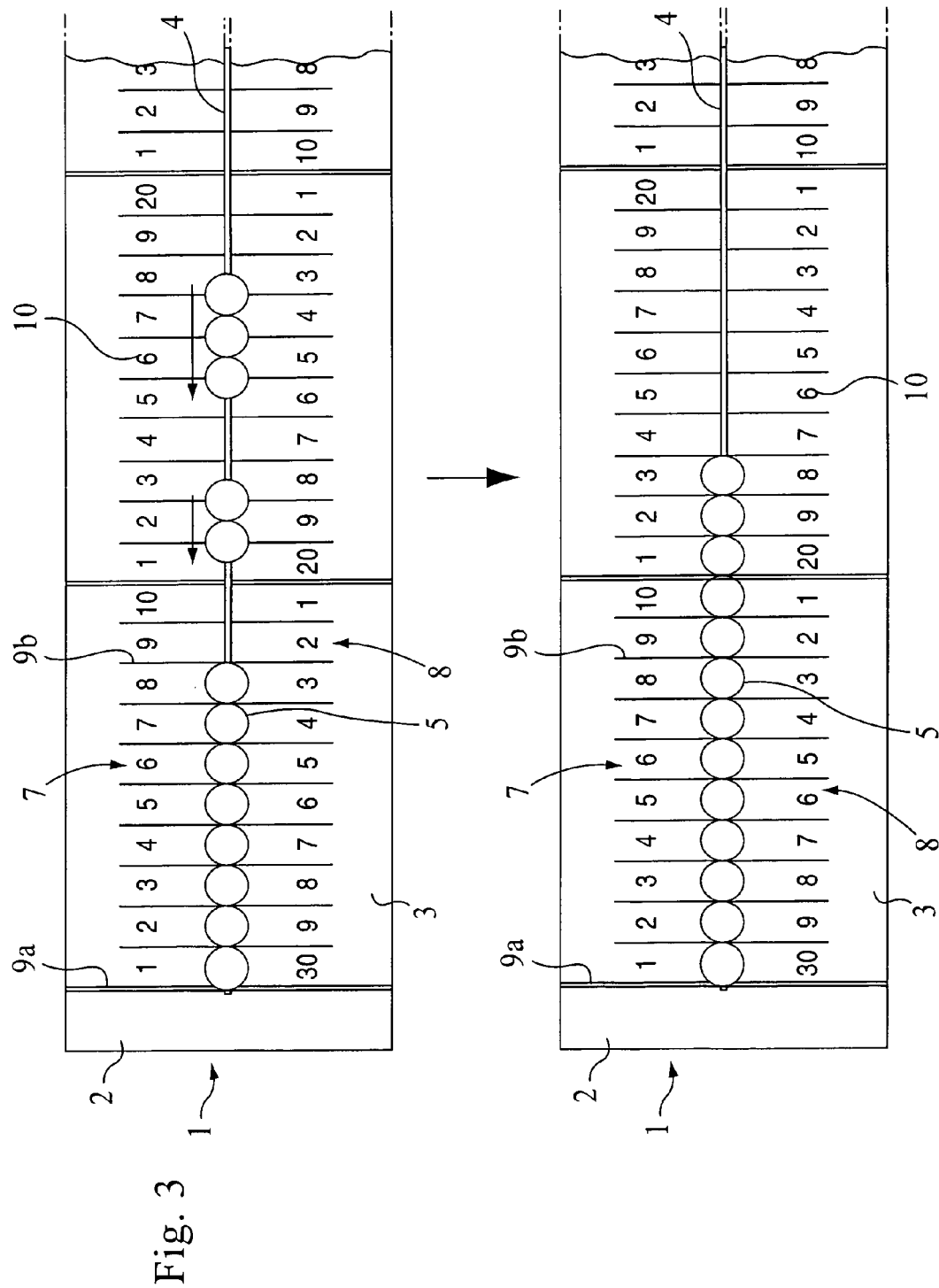
FIG. 3 is a top plan view showing an operation method of the case, in which an addition is to be learned by using the calculation training tool according to the embodiment.

Next, FIG. 3 shows an operation method for determining the answer of a calculation (or an addition) of (8+5) by an addend decomposing method using the upper scales 7.

In the operation, specifically, the augend 8 is expressed by arranging eight bead-shaped members 5 as the placed beads rightward from the left end of the guide member 4. Next, the addend 5 is decomposed into a complement "2" of "8" to "10" and "3". Of the residual bead-shaped members 5, two bead-shaped members 5 and three bead-shaped members 5 are moved individually together as the carried beads leftward from the right side while sequentially reciting them, so that they are merged into the eight placed beads. As a result, the last carried bead stops at the position of the scale indicating numeral 13 so that the answer of "13" can be obtained.

Figure 4:
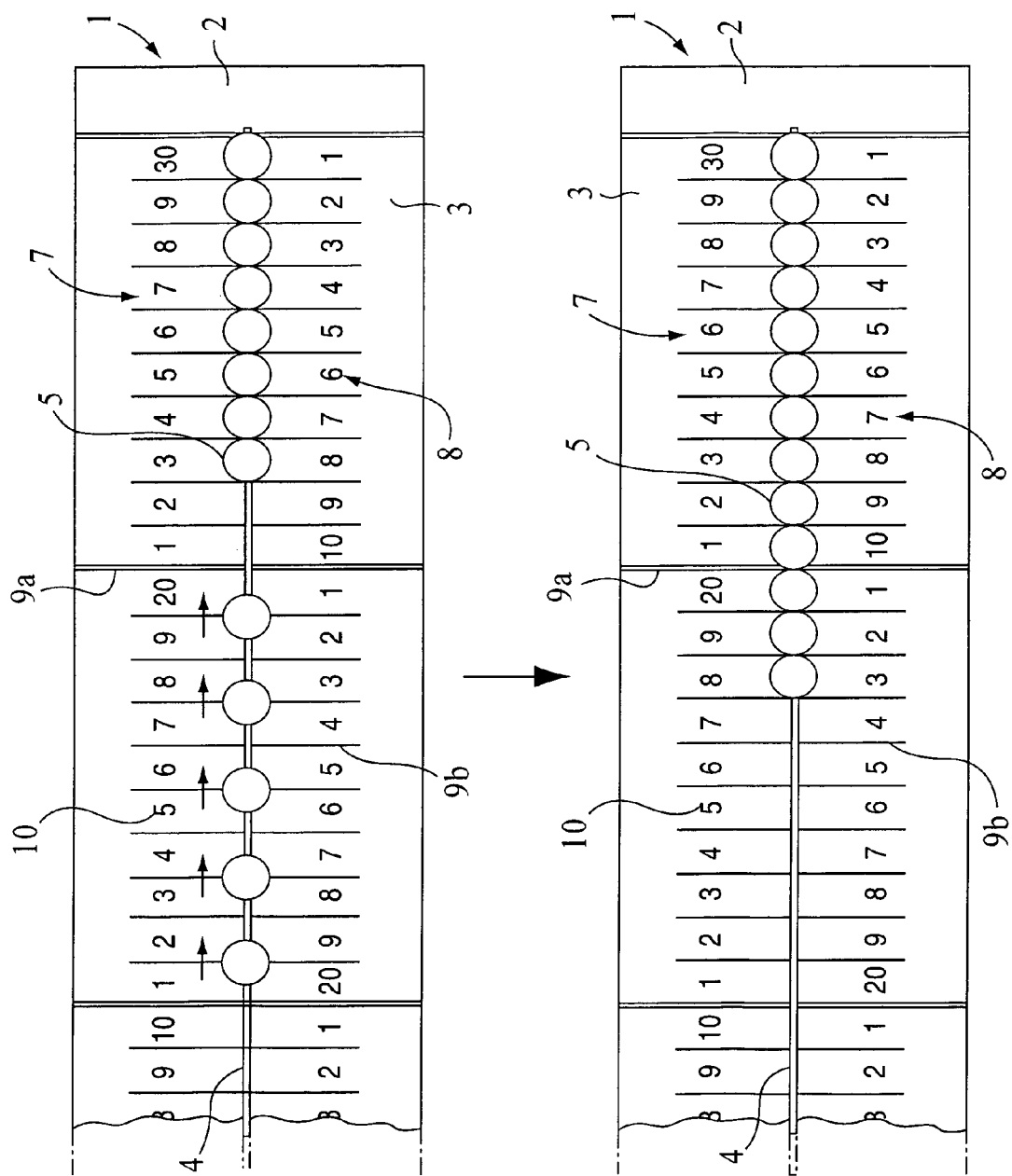
FIG. 4 is a top plan view showing an operation method of the case, in which an addition is to be learned by using the calculation training tool according to the embodiment.

Next, FIG. 4 shows an operation method for determining the answer of a calculation (e.g., an addition) of (5+8) by a counting-up method using the lower scales 8.

Specifically, the addend 8 is expressed by arranging eight bead-shaped members 5 as the placed beads leftward from the right end of the guide member 4. Of the residual bead-shaped members 5, the five bead-shaped members 5 as the augend 5 are moved one by one as the carried beads rightward from the left side while sequentially reciting them, so that the five bead-shaped members 5 are merged into the eight placed beads. As a result, the last carried bead stops at the position of the scale indicating the numeral 13 so that the answer of 13 can be obtained.

Figure 5:
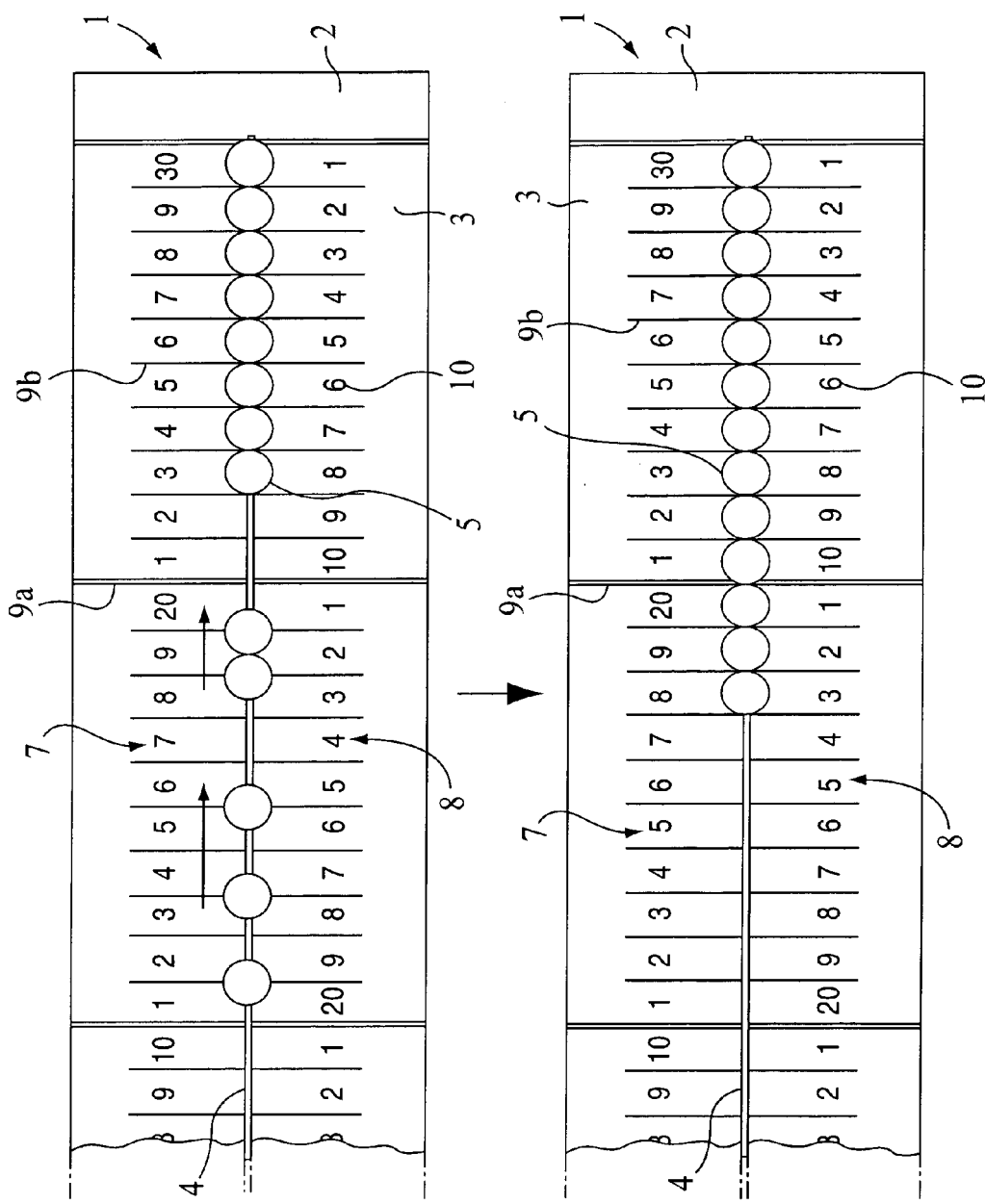
FIG. 5 is a top plan view showing an operation method of the case, in which an addition is to be learned by using the calculation training tool according to the embodiment.

Next, FIG. 5 shows an operation method for determining the answer of a calculation (or an addition) of (5+8) by an augend decomposing method using the lower scales 8.

In the operation, specifically, the addend 8 is expressed by arranging eight bead-shaped members 5 as the placed beads leftward from the right end of the guide member 4. Next, the augend 5 is decomposed into a complement "2" of "8" to "10" and "3". Of the residual bead-shaped members 5, two bead-shaped members 5 and three bead-shaped members 5 are moved individually together as the carried beads rightward from the left side while sequentially reciting them, so that they are merged into the eight placed beads. As a result, the last carried bead stops at the position of the scale indicating numeral 13 so that the answer of 13 can be obtained.

Figure 6:
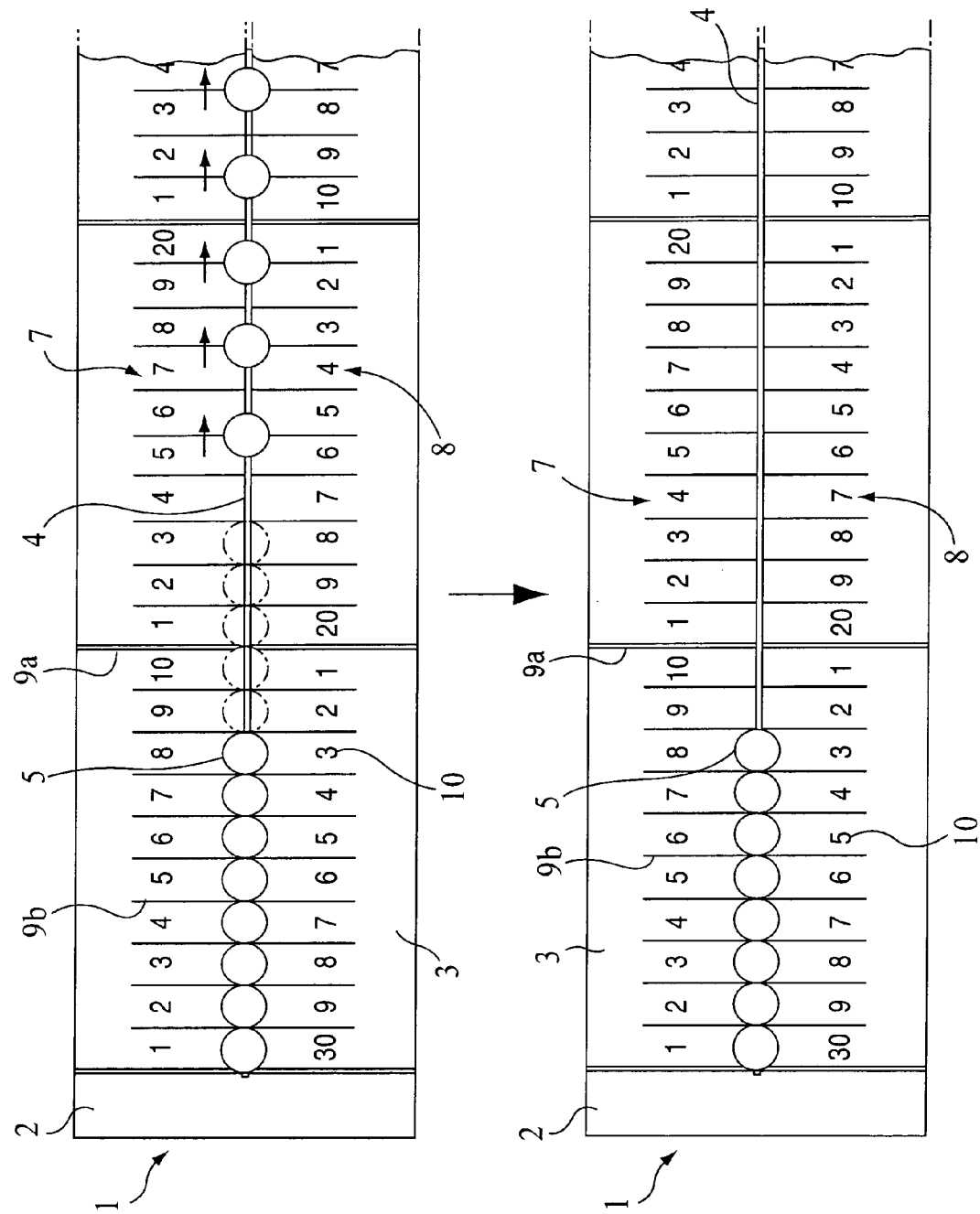
FIG. 6 is a top plan view showing an operation method of the case, in which a subtraction is to be learned by using the calculation training tool according to the embodiment.

Next, FIG. 6 shows an operation method for determining the answer of a calculation (e.g., a subtraction) of (13–5) by a counting-down method using the upper scales 7.

Specifically, the minuend 13 is expressed by arranging thirteen bead-shaped members 5 as the placed beads rightward from the left end of the guide member 4. Of the residual bead-shaped members 5, the five bead-shaped members 5 as the subtrahend 5 are moved one by one as the carried beads rightward from the left side while sequentially reciting them, so that the total five bead-shaped members 5 are separated from the thirteen placed beads. As a result, the last placed bead left is located at the position of the scale indicating the numeral 8 so that the answer of 8 can be obtained.

Figure 7:
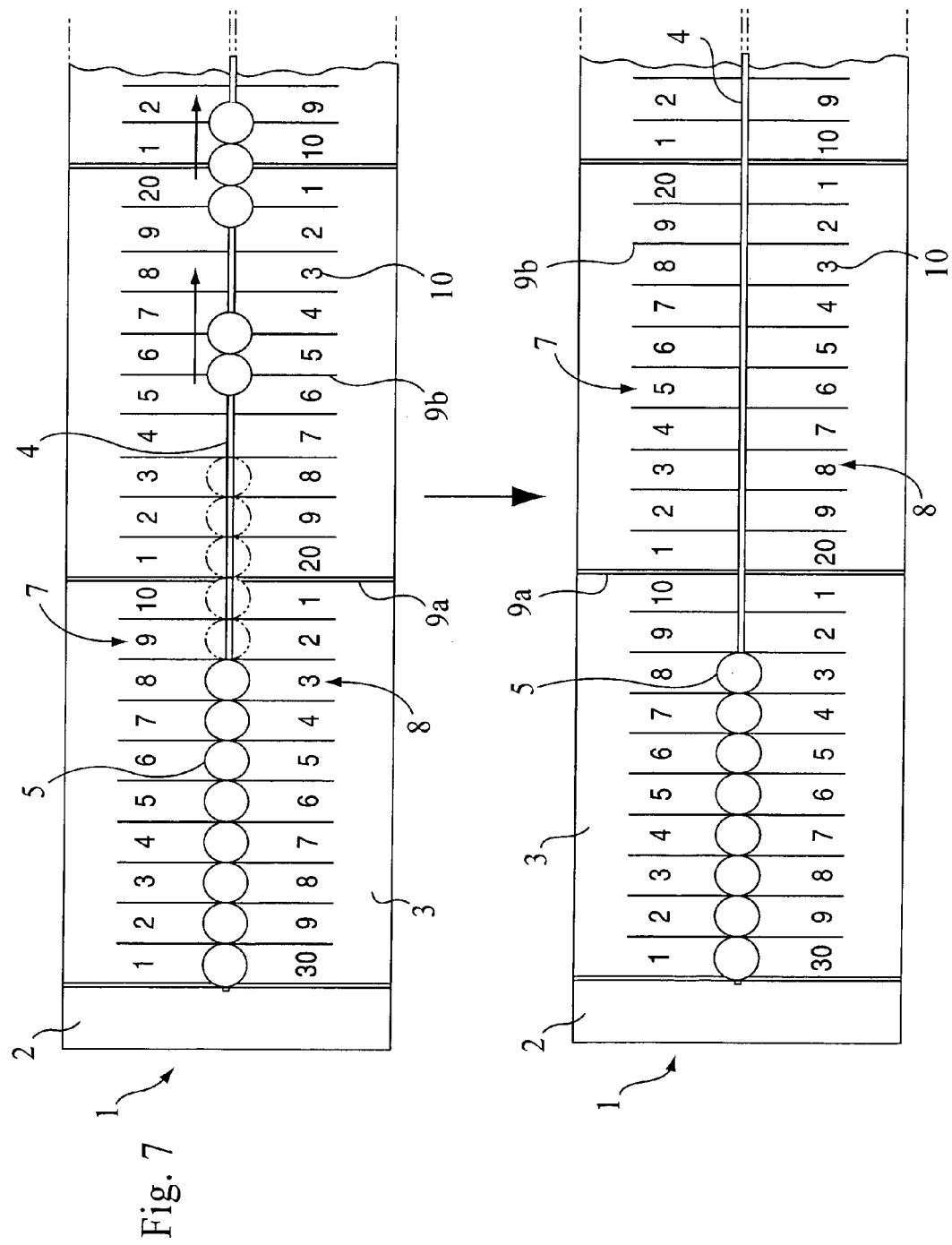
FIG. 7 is a top plan view showing an operation method of the case, in which a subtraction is to be learned by using the calculation training tool according to the embodiment.

Next, FIG. 7 shows an operation method for determining the answer of a calculation (or a subtraction) of (13–5) by a subtrahend decomposing method (or subtraction-subtraction method) using the upper scales 7.

In the operation, specifically, the minuend "13" is expressed by arranging thirteen bead-shaped members 5 as the placed beads rightward from the left end of the guide member 4. The subtrahend 5 is decomposed into "2" and "3" of minuend "13". Of the thirteen placed beads, three bead-shaped members and two bead-shaped members 5 are moved individually together as the carried beads rightward from the left side while sequentially reciting them, so that the total five carried beads are separated from the thirteen placed beads. As a result, the last placed bead left is located at the position of the scale indicating numeral 8 so that the answer of 8 can be obtained.

Figure 8:
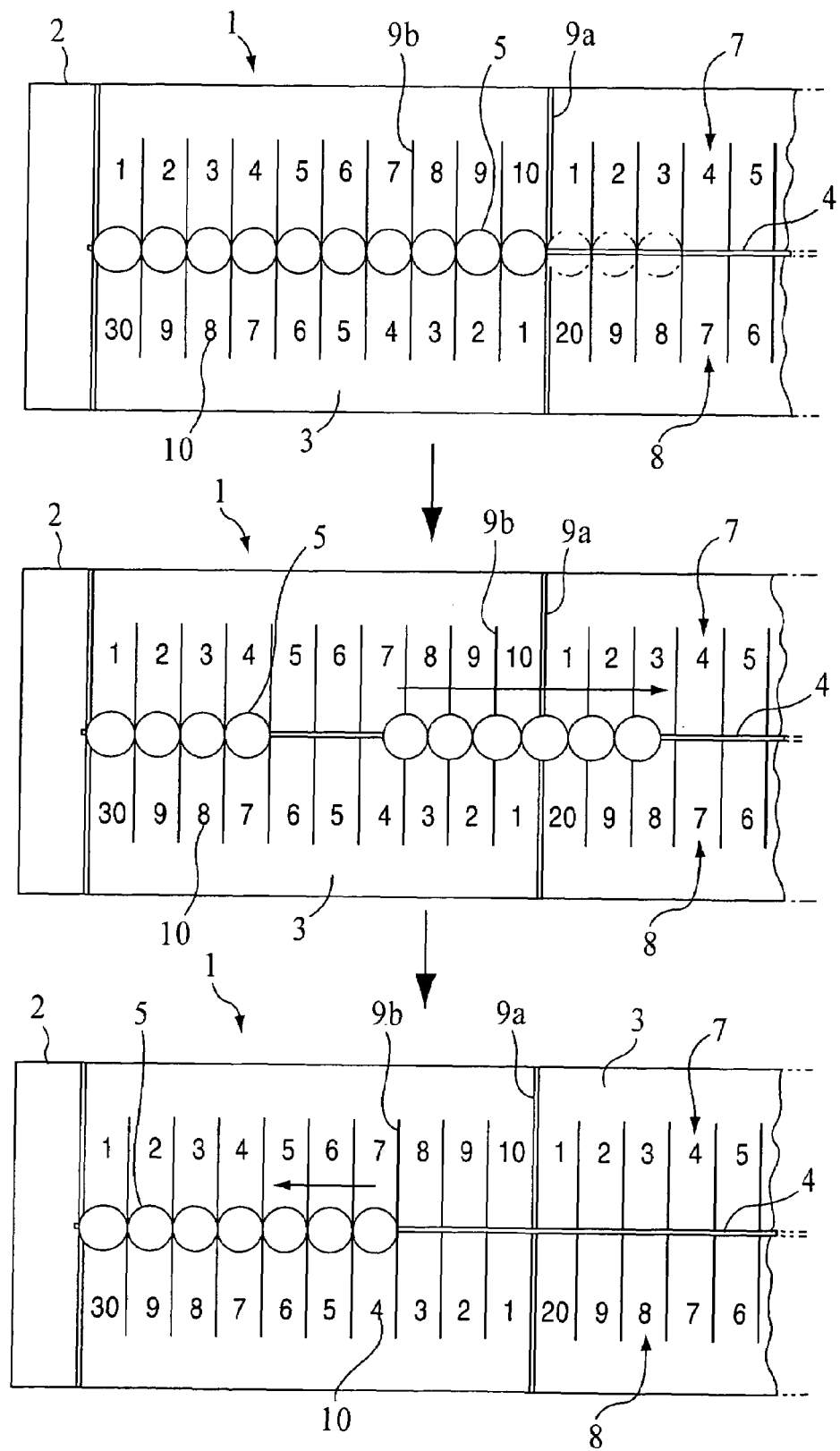
FIG. 8 is a top plan view showing an operation method of the case, in which a subtraction/addition is to be learned by using the calculation training tool according to the embodiment.

Next, FIG. 8 shows an operation method for determining the answer of a calculation (or a subtraction) of (13–6) by a subtraction/addition method using the upper scales 7.

In the operation, specifically, the minuend 13 is expressed by decomposing itself into 10 and 3 and by arranging ten bead-shaped members 5 as the placed beads rightward from the left end of the guide member 4. The residual 3 is reserved so that it may be added later. Of the ten placed beads, six bead-shaped members as the subtrahend 6 are moved together as the carried beads rightward from the left side while sequentially reciting them. At this time, the four bead-shaped members 5 are left as the placed beads. Next, the left numeral 3 is added. Specifically, the three bead-shaped members are moved as the carried beads leftward from the right side so that they are merged into the four placed beads. As a result, the last carried bead stops at the position of the scale indicating the numeral 7 so that the answer of 7 can be obtained.

On the other hand, the calculation training system according to the embodiment uses the calculation training tool 1 thus far described, together with the learning papers 11a, 11b, 11c, 14a, 14b, 14c, 17a, 17b, 19a, 19b, 19c, 24a, 24b, 24c, 28a, 28b, 28c, 32a and 32b, as shown in FIG. 9 to FIG. 15.

These learning papers 11a, 11b, 11c, 14a, 14b, 14c, 17a, 17b, 19a, 19b, 19c, 24a, 24b, 24c, 28a, 28b, 28c, 32a and 32b are provided with three patterns for learning the number composing method, the operand decomposing method and the addend (subtrahend) decomposing method.

Figure 9:
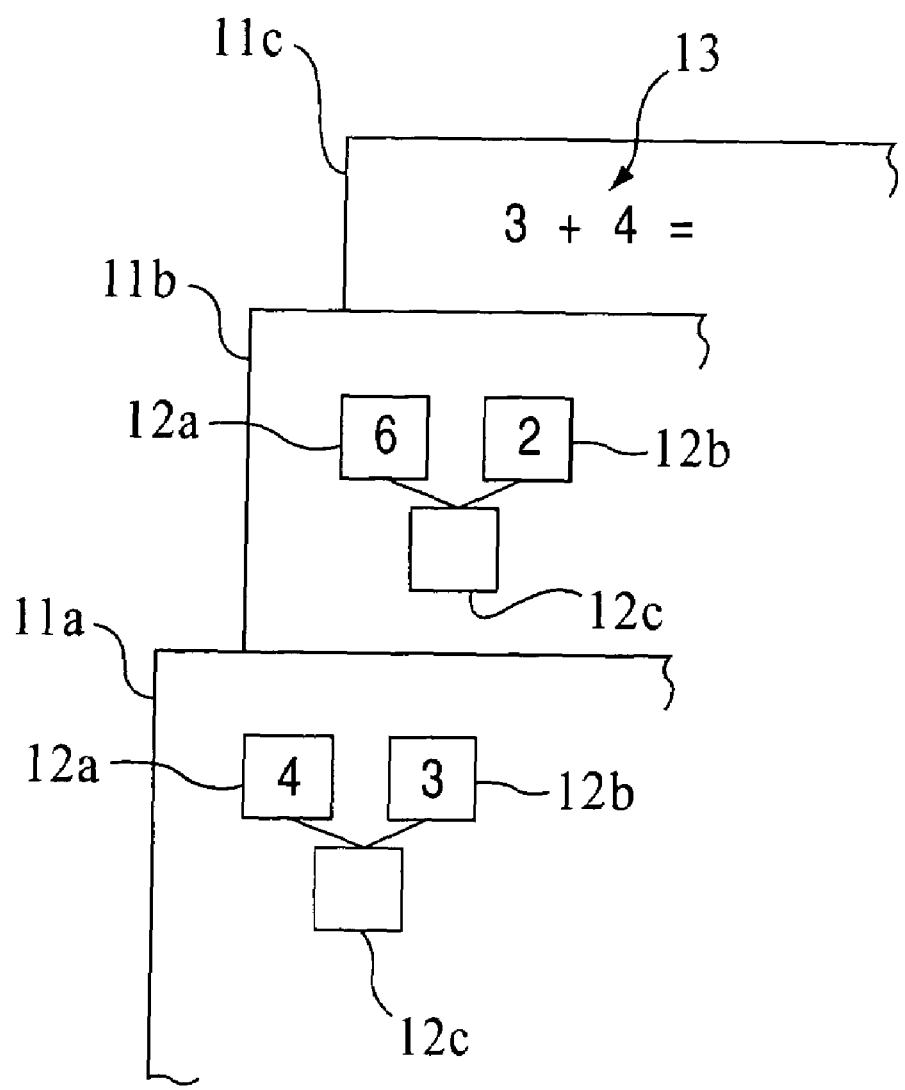
FIG. 9 is a top plan view of a portion of a learning print according to the embodiment.

FIG. 9 shows the learning papers 11a, 11b and 11c for learning the number composing method. This number composing method means an addition up to 10 and provides a basis for the addition.

These learning papers 11a, 11b and 11c are composed of three sheets, whose the first and second learning papers 11a and 11b display square frames 12a, 12b and 12c, two on the upper stage and one on the lower stage. The two upper stage frames 12a and 12b display two arbitrary numerals to make 10 or less when added, but the lower stage frame 12c is blank. These three frames 12a, 12b and 12c make a set, and this set is printed in plurality.

The pupil writes the numeral, as obtained by composing the two numerals displayed in the upper frames 12a and 12b, in the lower blank frame 12c.

Here, the first learning print 11a and the second learning print 11b are identical in construction, but the first is used for introducing the learning of the composing method whereas the second is used for the training. On the other hand, the third learning print 11c is printed with a plurality of addition problems up to 10 by Formula 13.

The pupil can learn the composing method with the three learning papers 11a, 11b and 11c thus far described.

Figure 10:
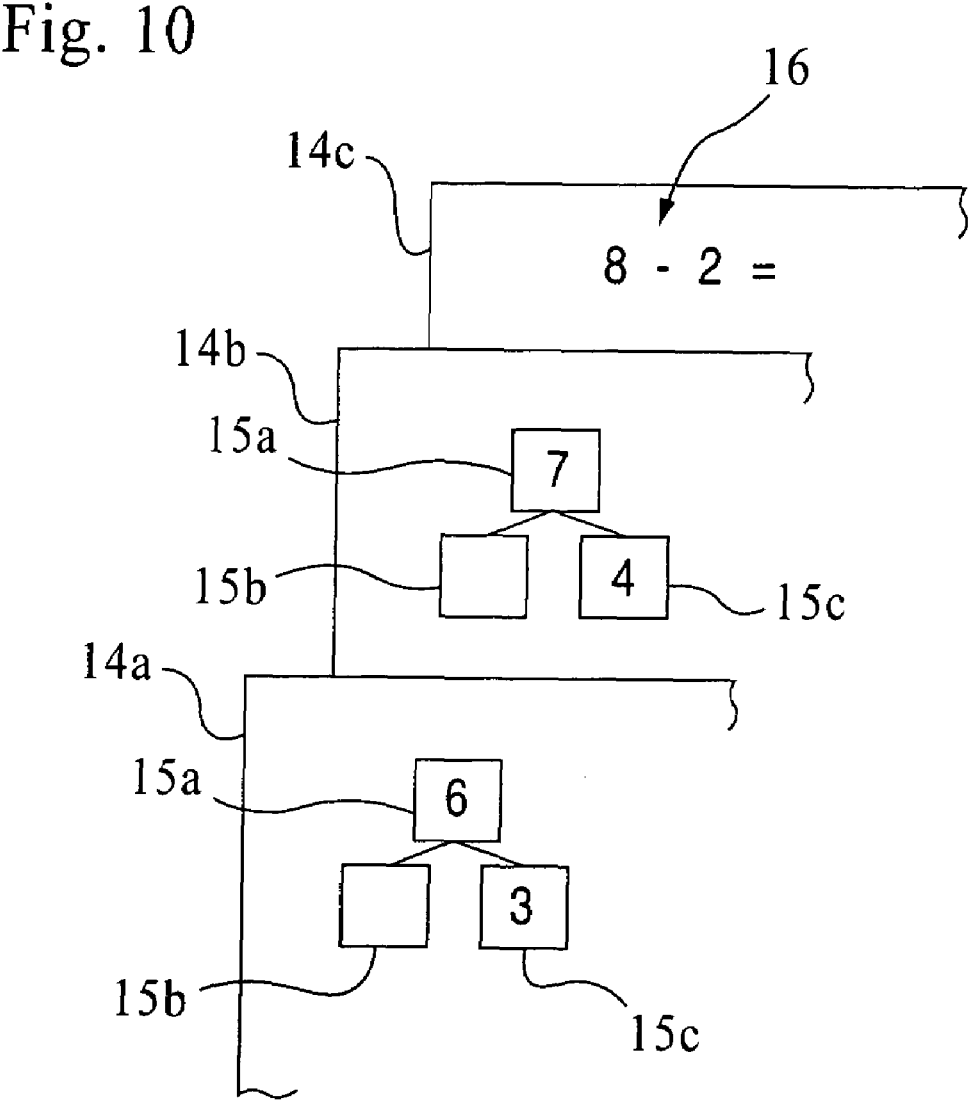
FIG. 10 is a top plan view of a portion of a learning print according to the embodiment.

Next, FIG. 10 shows the operand decomposing method and the learning papers 14a, 14b and 14c for learning subtraction problems up to 10. Here, the operand decomposing method means that an operand (i.e., a minuend) A is decomposed into suitable numbers when B is subtracted from A.

These learning papers 14a, 14b and 14c are composed of three sheets, whose the first and second learning papers 14a and 14b display square frames 15a, 15b and 15c, one on the upper stage and two on the lower stage. One upper stage frame 15a displays an arbitrary operand of 10 or less in advance. Of the two lower stage frames 15b and 15c, the left side frame 15b is blank, but the right side frame 15c displays an arbitrary number. These three frames 15a, 15b and 15c make a set, and this set is printed in plurality.

The pupil writes the number, which makes the number displayed in the upper frame 15a when added to the number displayed in the lower right frame 15c, in the lower left frame 15b. The first learning print 14a and the second learning print 14b are identical in construction, but the first is used for introducing the learning of the operand decomposing method whereas the second is used for the training.

On the other hand, the third learning print 14c is printed with a plurality of subtraction problems up to 10 by Formula 16. The pupil can learn the subtractions up to 10 according the operand decomposing method with the three learning papers 14a, 14b and 14c thus far described.

Figure 11:
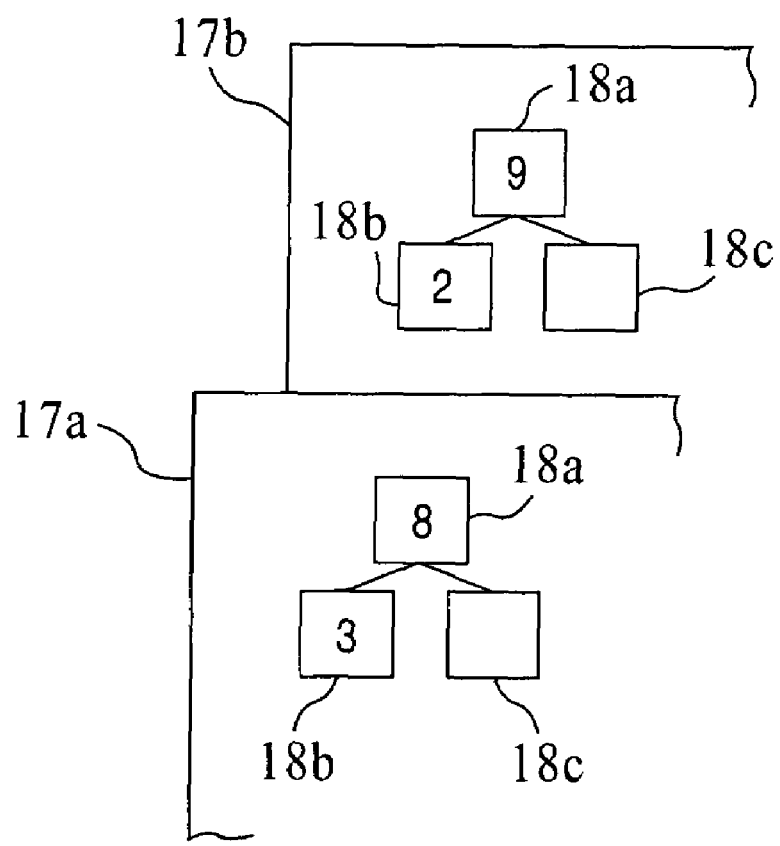
FIG. 11 is a top plan view of a portion of a learning print according to the embodiment.

Next, FIG. 11 shows the learning papers 17a and 17b for learning the addend decomposing method. The addend decomposition means that an addend B in an addition is decomposed into suitable numbers when B is added to A.

These learning papers 17a and 17b are composed of two sheets, whose the first and second learning papers 17a and 17b display square frames 18a, 18b and 18c, one on the upper stage and two on the lower stage. One upper stage frame 18a displays an arbitrary number of 10 or less in advance. Of the two lower stage frames 18b and 18c, the right side frame 18c is blank, but the left side frame 18b displays an arbitrary number. These three frames 18a, 18b and 18c make a set, and this set is printed in plurality.

The pupil writes the number, which makes the number displayed in the upper frame 18a when added to the number displayed in the lower left frame 18b, in the lower right blank frame 18c.

Here, the first learning print 17a and the second learning print 17b are identical in construction, but the first is used for introducing the learning of the addend decomposing method whereas the second is used for the training. The pupil can learn the addend decomposing method up to 10 with the two learning papers 17a and 17b thus far described.

Figure 12:
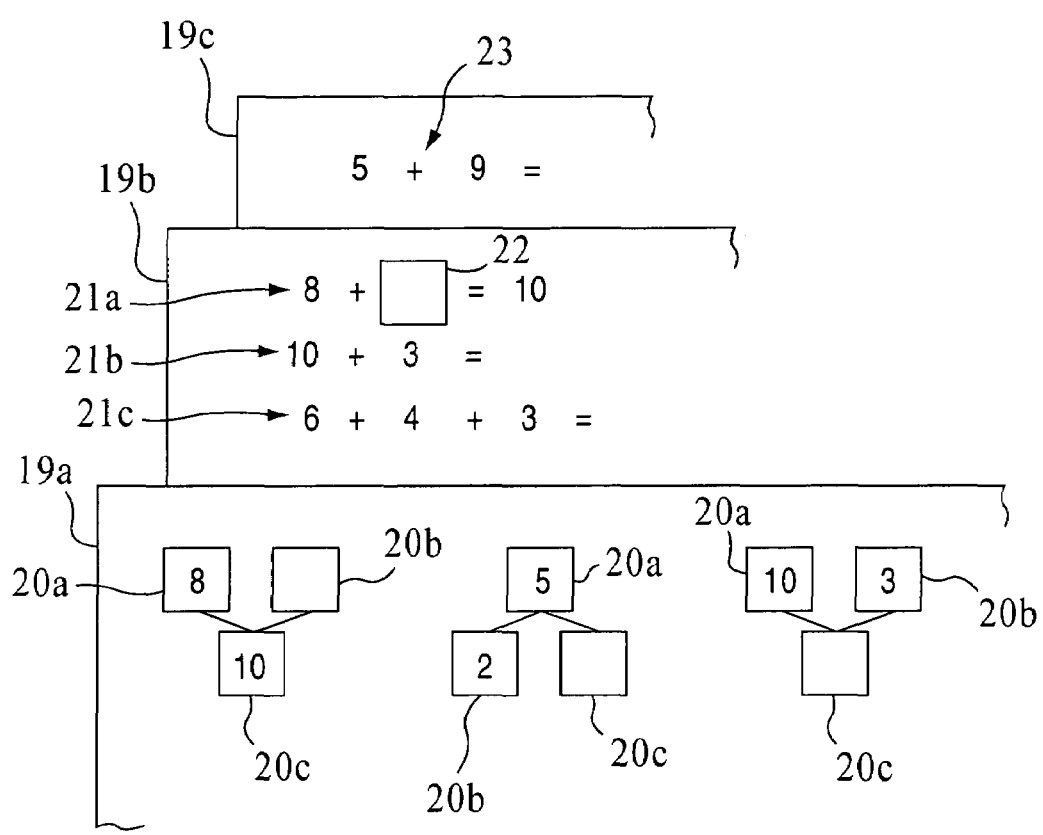
FIG. 12 is a top plan view of a portion of a learning print according to the embodiment.

Next, FIG. 12 shows the learning papers 19a, 19b and 19c for learning the addend decomposing method and the carrying-up addition. This carrying-up addition means an addition to have the answer of addition of 10 or more.

These learning papers 19a, 19b and 19c are composed of three sheets, whose the first learning print 19a displays square frames 20a, 20b and 20c, two on the upper stage and one on the lower stage. The upper left frame 20a displays an arbitrary numeral, and the lower frame 20c displays the numeral 10, but the upper right frame 20b is blank. These three frames 20a, 20b and 20c make a set, and this set is printed in plurality.

The pupil writes such a number in the upper right blank frame 20b as makes 10 displayed in the lower frame 20c, when added to the number displayed in the upper left frame 20a.

Moreover, the first learning print 19a displays the square frames 20a, 20b and 20c, one on the upper stage and two on the lower stage. The upper frame 20a and the lower left frame 20b display arbitrary numerals, but the lower right frame 20c is blank. These three frames 20a, 20b and 20c make a set, and this set is printed in plurality.

The pupil writes such a number in the lower right blank frame 20c as makes the number displayed in the upper frame 20a, when added to the number displayed in the lower left frame 20b.

Moreover, the first learning print 19.a displays square frames 20a, 20b and 20c, two on the upper stage and one on the lower stage. The upper left frame 20a displays the numeral 10, and the upper right frame 20b displays an arbitrary numeral, but the lower frame 20c is blank. These three frames 20a, 20b and 20c make a set, and this set is printed in plurality.

The pupil writes such a number in the lower blank frame 20c as makes the number, which is obtained by adding 10 displayed in the upper left frame 20a and the number displayed in the upper right frame 20b.

Moreover, the second learning print 19b papers a plurality of addition problems by three kinds of Formulas 21a, 21b and 21c.

In the problem of the first kind, an addend is a blank frame 22, but the augend and the answer are displayed. The pupil fills up the blank of the frame 22.

In the problem of the second kind, an augend is 10, and the answer is determined by adding an arbitrary number to 10.

In the problem of the third kind, the answer is determined by adding two arbitrary numbers to the augend. The augend and the first addend make complements of 10 to each other.

Moreover, the third learning print 19c papers a plurality of carrying-up addition problems according to Formula 23.

The pupil can learn the addend decomposing method and the carrying-up addition with the three learning papers 19a, 19b and 19c thus far described.

Figure 13:
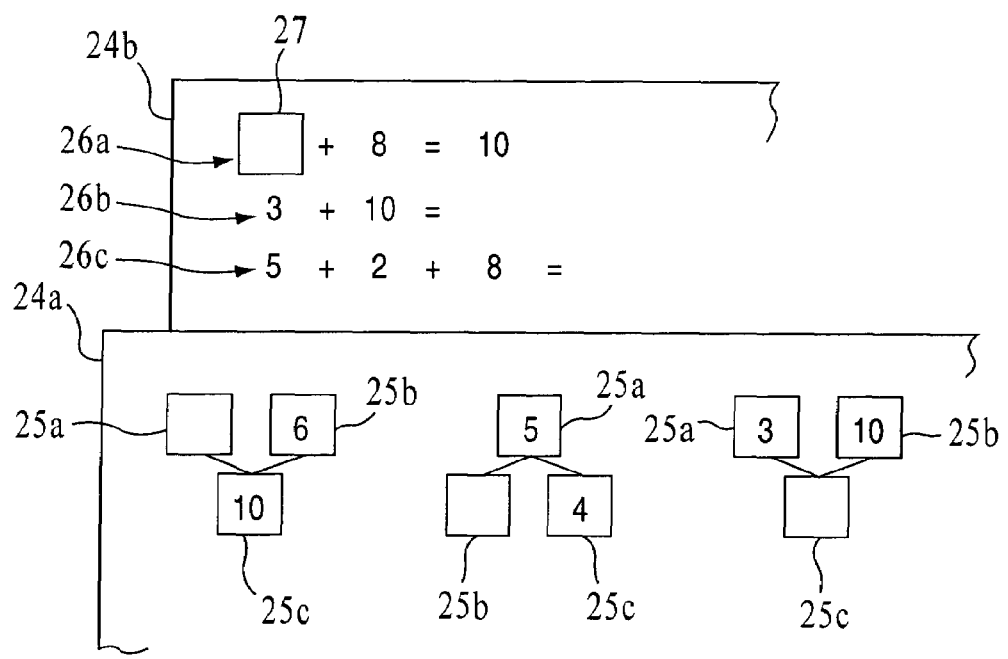
FIG. 13 is a top plan view of a portion of a learning print according to the embodiment.

Next, FIG. 13 shows the learning papers 24a and 24b for learning the operand decomposing method and the carrying-up addition.

These learning papers 24a and 24b are composed of two sheets, whose the first learning print 24a displays square frames 25a, 25b and 25c, two on the upper stage and one on the lower stage. The upper left frame 25a is blank, but the upper right frame 25b displays an arbitrary numeral, and the lower frame 25c displays the numeral 10. These three frames 25a, 25b and 25c make a set, and this set is printed in plurality.

The pupil writes such a number in the upper left blank frame 25a as makes 10 displayed in the lower frame 25c, when added to the number displayed in the upper right frame 25b.

Moreover, the first learning print 24a displays the square frames 25a, 25b and 25c, one on the upper stage and two on the lower stage. The upper frame 25a and the lower right frame 25c display arbitrary numerals, but the lower left frame 25b is blank. These three frames 25a, 25b and 25c make a set, and this set is printed in plurality.

The pupil writes such a number in the lower left blank frame 25b as makes the number displayed in the upper frame 25a, when added to the number displayed in the lower right frame 25c.

Moreover, the first learning print 24a displays square frames 25a, 25b and 25c, two on the upper stage and one on the lower stage. The upper left frame 25a displays an arbitrary numeral, and the upper right frame 25b displays the numeral 10, but the lower frame 25c is blank. These three frames 25a, 25b and 25c make a set, and this set is printed in plurality.

The pupil writes such a number in the lower blank frame 25c as makes the number, which is obtained by adding the numeral displayed in the upper left frame 25a and 10 displayed in the upper right frame 25b.

Moreover, the second learning print 24b papers a plurality of addition problems by three kinds of Formulas 26a, 26b and 26c.

In the problem of the first kind, an operand is a blank frame 27, but an arbitrary addend and the answer of 10 are displayed. The pupil fills up the blank of the frame 27.

In the problem of the second kind, an operand is an arbitrary number, and an addend is 10, so that the answer is determined by adding them.

In the problem of the third kind, the answer is determined by adding numbers two times to the operand. The operand is an arbitrary number, and the number to be added at first and the number to be secondly added make complements of 10 to each other.

The pupil can learn the operand decomposing method and the carrying-up addition with the two learning papers 24a and 24b thus far described.

Figure 14:
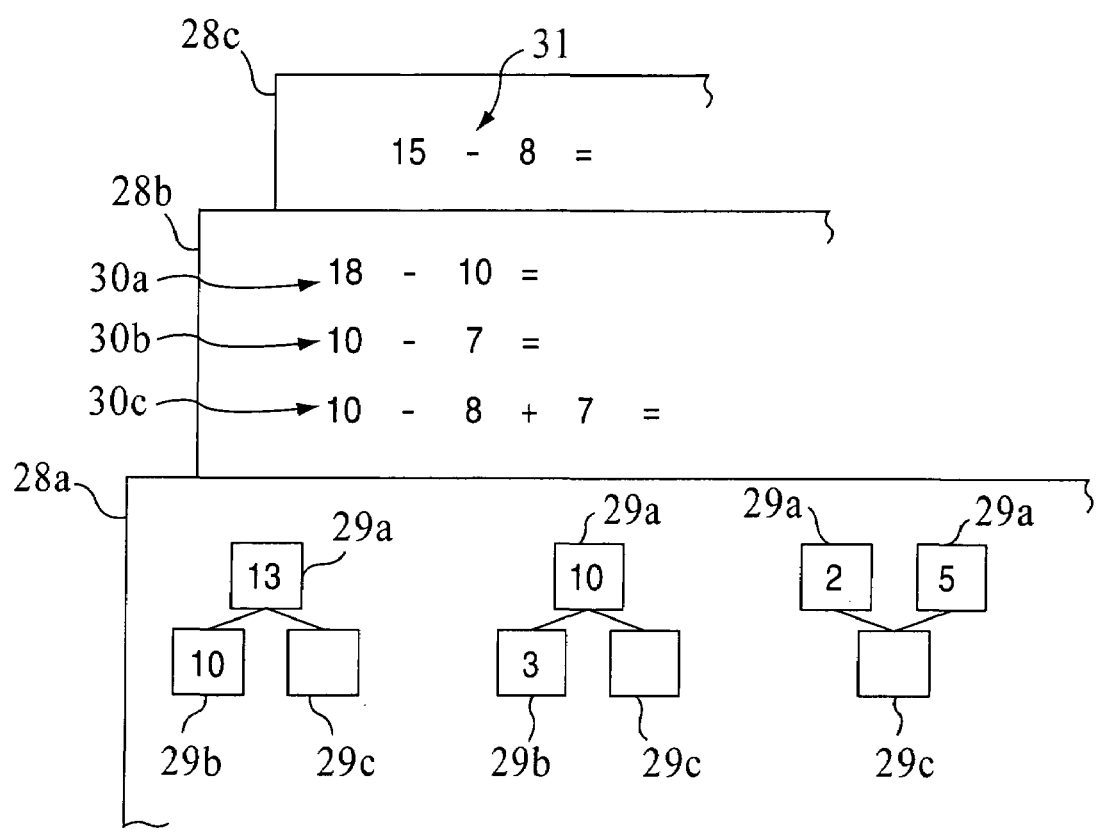
FIG. 14 is a top plan view of a portion of a learning print according to the embodiment.

Next, FIG. 14 shows the learning papers 28a, 28b and 28c for learning the subtraction/addition method and the carrying-down subtraction.

These learning papers 28a, 28b and 28c are composed of three sheets, whose the first learning print 28a displays square frames 29a, 29b and 29c, one on the upper stage and two on the lower stage. The upper frame 29a displays an arbitrary numeral, and the lower left frame 29b displays the numeral 10, but the lower right frame 29c is blank. These three frames 29a, 29b and 29c make a set, and this set is printed in plurality.

The pupil writes such a number in the lower right blank frame 29c as makes the number, which makes the number displayed in the upper frame 29a, when added to the number displayed in the lower left frame 29b.

Moreover, the first learning print 28a displays the square frames 29a, 29b and 29c, one on the upper stage and two on the lower stage. The upper frame 29a displays the numeral 10, and the lower left frame 29b displays an arbitrary numeral, but the lower right frame 29c is blank. These three frames 29a, 29b and 29c make a set, and this set is printed in plurality.

The pupil writes such a number in the lower right blank frame 29c as makes the number, which makes 10 displayed in the upper frame 29a, when added to the number displayed in the lower left frame 29b.

Moreover, the first learning print 28a displays square frames 29a, 29b and 29c, two on the upper stage and one on the lower stage. The upper left and right frame 29a and 29b individually display arbitrary numerals, but the lower frame 29c is blank. These three frames 29a, 29b and 29c make a set, and this set is printed in plurality.

The pupil writes such a number in the lower blank frame 29c as makes the number, which is obtained by adding the numeral displayed in the upper left frame 29a and the number displayed in the upper right frame 29b.

Moreover, the second learning print 28b papers a plurality of subtraction problems by three kinds of Formulas 30a, 30b and 30c.

In the problem of the first kind, an arbitrary operand of 10 or more is displayed to determine an answer by subtracting 10 from that operand.

In the problem of the second kind, an operand is 10, so that the answer is determined by subtracting an arbitrary number from 10.

In the problem of the third kind, an operand is 10, so that the answer is determined by subtracting an arbitrary number from 10 and by adding an arbitrary number.

The third learning print 28c papers a plurality of carrying-down subtraction problems by Formula 31.

The pupil can learn the subtraction/addition method and the carrying-down subtraction with the three learning papers 28a, 28b and 28c thus far described.

Figure 15:
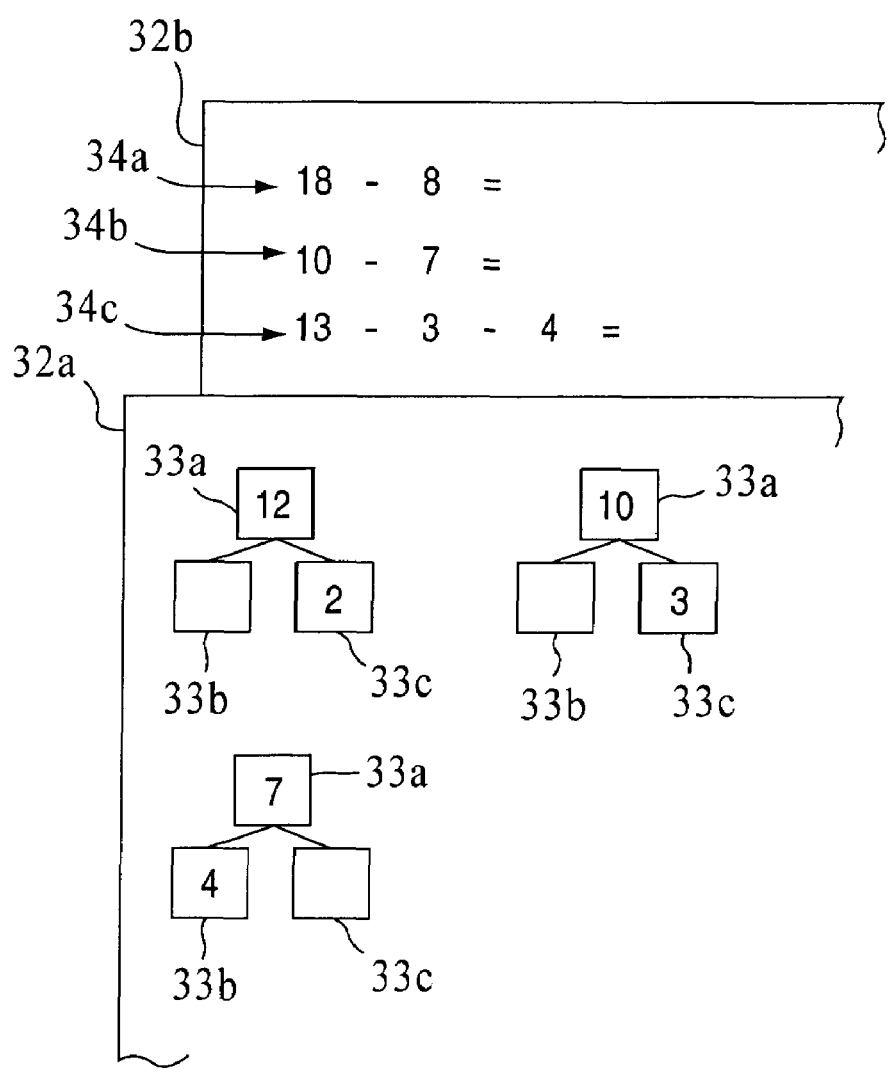
FIG. 15 is a top plan view of a portion of a learning print according to the embodiment.

Next, FIG. 15 shows the learning papers 32a and 32b for learning the subtrahend decomposing method (or the subtraction/subtraction method) and the carrying-down subtraction.

These learning papers 32a and 32b are composed of two sheets whose the first learning print 32a displays square frames 33a, 33b and 33c, one on the upper stage and two on the lower stage. The upper frame 33a displays an arbitrary numeral, and the lower right frame 33c displays an arbitrary numeral, but the lower left frame 33b is blank. These three frames 33a, 33b and 33c make a set, and this set is printed in plurality.

The pupil writes such a number in the lower left blank frame 33b as makes the number, which makes the number displayed in the upper frame 33a, when added to the number displayed in the lower right frame 33c.

Moreover, the first learning print 32a displays the square frames 33a, 33b and 33c, one on the upper stage and two on the lower stage. The upper frame 33a displays the numeral 10, and the lower right frame 33c displays an arbitrary numeral, but the lower left frame 33b is blank. These three frames 33a, 33b and 33c make a set, and this set is printed in plurality.

The pupil writes such a number in the lower left blank frame 33b as makes the number, which makes 10 displayed in the upper frame 33a, when added to the number displayed in the lower right frame 33c.

Likewise, moreover, the first learning print 32a displays square frames 33a, 33b and 33c, one on the upper stage and two on the lower stage. The upper frame 33a displays an arbitrary numeral, and the lower left frame 33c displays an arbitrary numeral, but the lower right frame 33b is blank. These three frames 33a, 33b and 33c make a set, and this set is printed in plurality.

The pupil writes such a number in the lower right blank frame 33c as makes the number, which makes the number displayed in the upper frame 33a, when added to the numeral displayed in the lower left frame 33b.

Moreover, the second learning print 32b papers a plurality of subtraction problems by three kinds of Formulas 34a, 34b and 34c.

The problem of the first kind is to subtract a number equal to the number of the order one of an operand, from this operand.

In the problem of the second kind, an operand is 10, and an arbitrary number is subtracted from that operand.

In the problem of the third kind, the answer is determined by subtracting numbers two times from an operand. The operand and the second subtrahend are arbitrary numbers, but the first subtrahend is the number, which makes 10 when subtracted from the operand.

The pupil can learn the subtrahend decomposing method and the carrying-down subtraction with the two learning papers 32a and 32b thus far described.

By using the learning papers 11a, 11b, 11c, 14a, 14b, 14c, 17a, 17b, 19a, 19b, 19c, 24a, 24b, 24c, 28a, 28b, 28c, 32a and 32b thus far described, the pupil is easily enabled not only to learn the aforementioned additions and subtractions according to the compositions and decompositions of numbers but also to understand the numerals (or set numbers), the construction (e.g., composition or decomposition) of numbers, and the decimal system.

Moreover, the pupil can understand the implications of symbols "+" and "−" so deeply as to understand the concepts of the increase/decrease, sum and remainder, so that the pupil can easily understand the contents of written problems and solve them.

What is claimed is:

1. A calculation training tool comprising:
   a substrate;
   a plurality of movable members movably mounted on said substrate and corresponding individually to individual numerals for calculations; and
   a sequence of numerals of 1 to 9 arranged at an interval substantially equal to a spacing width of any one of said movable members,
   wherein said substrate is formed into a long plate shape,
   wherein said movable members are arranged slidably alone a guide member disposed in a longitudinal direction of said substrate,
   wherein division lines are formed between adjoining numerals,
   wherein said guide member is a rod disposed along the longitudinal direction of an abacus,
   wherein said movable members are arranged by threading said rod thereinto, and
   wherein said numeral sequence is arranged on both sides of said movable members threaded on said rod that the numeral sequence on one side is arranged in an ascending order from 1 to 9 and the numeral sequence on the other side is arranged in a descending order from 9 to 1.

2. A calculation training tool according to claim 1, wherein in said sequence of numerals, a numeral of 10 is arranged next to a first set of numerals of 1 to 9.

3. A calculation training tool according to claim 1, wherein said movable members are formed into a ball shape, and wherein addition or subtraction is practiced by using said movable members.

4. A calculation training tool according to claim 1, comprising a plurality of said rod arranged in parallel with each other in the a transverse direction relative to said substrate and wherein each rod has the movable members provided thereon.

5. A calculation training method using a calculation training tool including:
   a substrate;
   a plurality of movable members movably attached to the substrate; and
   a sequence of numerals of 1 to 9 arranged at an interval substantially equal to the transverse spacing of said diametrically small moving members,
   wherein said substrate is formed into a long plate shape,
   wherein said movable members are arranged slidably along a guide member disposed in a longitudinal direction of said substrate,
   wherein division lines are formed between adjoining numerals,
   wherein said guide member is a rod disposed along the longitudinal direction of an abacus,
   wherein said movable members are arranged by threading said rod thereinto, and
   wherein said numeral sequence is arranged on both sides of said movable members threaded on said rod that the numeral sequence on one side is arranged in an ascending order from 1 to 9 and the numeral sequence on the other side is arranged in a descending order from 9 to 1, the method comprising:
- a step of calculation training on how to use the calculation training tool together with a plurality of learning papers based on a first calculation method, a second calculation method, or a third calculation method; and
- a step of performing calculations by using the calculation training tool based on at least one of the first, second, and third calculation methods,
- wherein the first calculation method includes a numeral composing method wherein a sum is obtained by adding a plurality of values indicated on the calculation tool,
- wherein the second calculation method includes an operand decomposed method wherein a minuend is decomposed into a plurality of components, and
- wherein the third calculation method includes an addend/subtrahend decomposing method wherein an addend is decomposed into a plurality of components.

6. The method according to claim 5, wherein the plurality of learning papers comprise at least three numeral display portions, wherein first and second numeral display portions of the at least three numeral display portions display numerals and a third numeral display portion is free of any numerals, and wherein a user provides a correct numeral in the third numeral display portion.

7. A calculation training method using a calculation tool comprising:
- a substrate;
- a plurality of movable members movably attached to the substrate; and
- a sequence of numerals of 1 to 9 arranged at an interval substantially equal to a transverse spacing of any one of said movable members,
- wherein said substrate includes a surface that is sloped from a first edge to a second edge,
- the method comprising:
  - a step of calculation training on how to use the calculation training tool together with a plurality of learning papers based on a first calculation method, a second calculation method, or a third calculation method; and
  - a step of performing calculations by using the calculation training tool based on at least one of the first, second, and third calculation methods,
- wherein the first calculation method includes a numeral composing method wherein a sum is obtained by adding a plurality of values indicated on the calculation tool,
- wherein the second calculation method includes an operand decomposed method wherein a minuend is decomposed into a plurality of components, and wherein the third calculation method includes an addend/subtrahend decomposing method wherein an addend is decomposed into a plurality of components.

8. The A calculation training method using a calculation tool comprising:
- a substrate:
- a plurality of movable members movably attached to the substrate; and
- a sequence of numerals of 1 to 9 arranged at an interval substantially equal to a transverse spacing of any one of said movable members,
- wherein said substrate includes a surface that is sloped from a first edge to a second edge,
- the method comprising:
  - a step of calculation training on how to use the calculation training tool together with a plurality of learning papers based on a first calculation method, a second calculation method, or a third calculation method; and
  - a step of performing calculations by using the calculation training tool based on at least one of the first, second, and third calculation methods,
- wherein the first calculation method includes a numeral composing method wherein a sum is obtained by adding a plurality of values indicated on the calculation tool,
- wherein the second calculation method includes an operand decomposed method wherein a minuend is decomposed into a plurality of components,
- wherein the third calculation method includes an addend/subtrahend decomposing method wherein an addend is decomposed into a plurality of components
- wherein said substrate is formed into a long plate shape,
- wherein said movable members are arranged slidably along a guide member disposed in a longitudinal direction of said substrate,
- wherein division lines are formed between adjoining numerals,
- wherein said guide member is a rod disposed along the longitudinal direction of an abacus,
- wherein said movable members are arranged by threading said rod thereinto, and
- wherein said numeral sequence is arranged on both sides of said movable members threaded on said rod that the numeral sequence on one side is arranged in an ascending order from 1 to 9 and the numeral sequence on the other side is arranged in a descending order from 9 to 1.

9. The method according to claim 7, wherein a numeral of 10 is arranged next to a first set of numerals of 1 to 9 in said sequence of numerals.

10. The method according to claim 7, wherein said movable members are formed into a ball shape, and wherein addition or subtraction is practiced by using said movable members.

11. The method according to claim 7, wherein said calculation training tool further comprises a plurality of said rod arranged in parallel with each other in a transverse direction relative to said substrate and wherein each rod has the movable members provided thereon.

12. A calculation training tool according to claim 1, wherein said substrate includes a surface that is sloped from a first edge to a second edge.

* * * * *